(12) United States Patent
Sasaki et al.

(10) Patent No.: US 12,684,677 B2
(45) Date of Patent: Jul. 14, 2026

(54) STRUCTURAL BODY, X-RAY GENERATION APPARATUS, X-RAY COMPUTED TOMOGRAPHY (CT) APPARATUS, AND MANUFACTURING METHOD FOR MANUFACTURING HEAT DISSIPATION PORTION

(71) Applicant: CANON KABUSHIKI KAISHA, Tokyo (JP)

(72) Inventors: Haruka Sasaki, Tokyo (JP); Yasuyuki Suzuki, Tokyo (JP); Kosuke Kurachi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/586,073

(22) Filed: Feb. 23, 2024

(65) Prior Publication Data

US 2024/0292509 A1     Aug. 29, 2024

(30) Foreign Application Priority Data

Feb. 24, 2023    (JP) ................................. 2023-027317

(51) Int. Cl.
| | |
|---|---|
| *G01N 23/046* | (2018.01) |
| *G01T 1/29* | (2006.01) |
| *H05G 1/02* | (2006.01) |

(52) U.S. Cl.
CPC ........... *H05G 1/025* (2013.01); *G01N 23/046* (2013.01); *G01T 1/2985* (2013.01)

(58) Field of Classification Search
CPC .... H05G 1/025; G01N 23/046; G01T 1/2985; H01J 2235/085; H01J 35/105;
(Continued)

(56) References Cited

U.S. PATENT DOCUMENTS

| | | |
|---|---|---|
| 5,768,338 A | 6/1998 | Kuroda |
| 9,099,273 B2 | 8/2015 | Hu |

(Continued)

FOREIGN PATENT DOCUMENTS

| | | |
|---|---|---|
| JP | S52115684 A | 9/1977 |
| JP | S6229034 A | 2/1987 |

(Continued)

OTHER PUBLICATIONS

Translation of JP2011141956A (Year: 2011).*

*Primary Examiner* — Uzma Alam
*Assistant Examiner* — Mamadou Faye
(74) *Attorney, Agent, or Firm* — Canon U.S.A., Inc. IP Division

(57)     ABSTRACT

The present invention is directed to providing a structural body in which the heat dissipation property is improved. A structural body heated to 700° C. or more includes a heat dissipation portion configured to dissipate heat of the structural body, wherein, on a surface of the heat dissipation portion, a first concavo-convex structure is provided where a plurality of first convex portions and a plurality of first concave portions are alternately arranged, wherein, when the structural body is heated to 700° C. or more, a peak wavelength of an electromagnetic wave of heat emitted from the heat dissipation portion is 3 μm or less, and wherein a distance between first convex portions close to each other among the plurality of first convex portions, and/or a distance between first concave portions close to each other among the plurality of first concave portions is less than half of the peak wavelength.

25 Claims, 9 Drawing Sheets

(58) Field of Classification Search
 CPC ........... H01J 2235/081; H01J 2235/086; H01J
2235/1254; A61B 6/40; A61B 6/035;
A61B 6/42; A61B 6/4488
 See application file for complete search history.

(56) References Cited

U.S. PATENT DOCUMENTS

| | | |
|---|---|---|
| 2009/0147361 A1 | 6/2009 | Gardiner |
| 2010/0264820 A1 | 10/2010 | Sumitomo |
| 2015/0078533 A1* | 3/2015 | Chan .................... H01J 35/064 |
| | | 378/143 |
| 2020/0198048 A1 | 6/2020 | Gatzen |
| 2020/0365361 A1 | 11/2020 | Yun |
| 2021/0364443 A1* | 11/2021 | Mori ...................... G16Y 40/20 |

FOREIGN PATENT DOCUMENTS

| | | | |
|---|---|---|---|
| JP | 2005158474 A | | 6/2005 |
| JP | 2010118283 A | | 5/2010 |
| JP | 2011141956 A | * | 7/2011 |
| JP | 2013089915 A | | 5/2013 |
| JP | 2018113270 A | | 7/2018 |
| JP | 2021177517 A | | 11/2021 |
| WO | 2020067075 A1 | | 4/2020 |

* cited by examiner

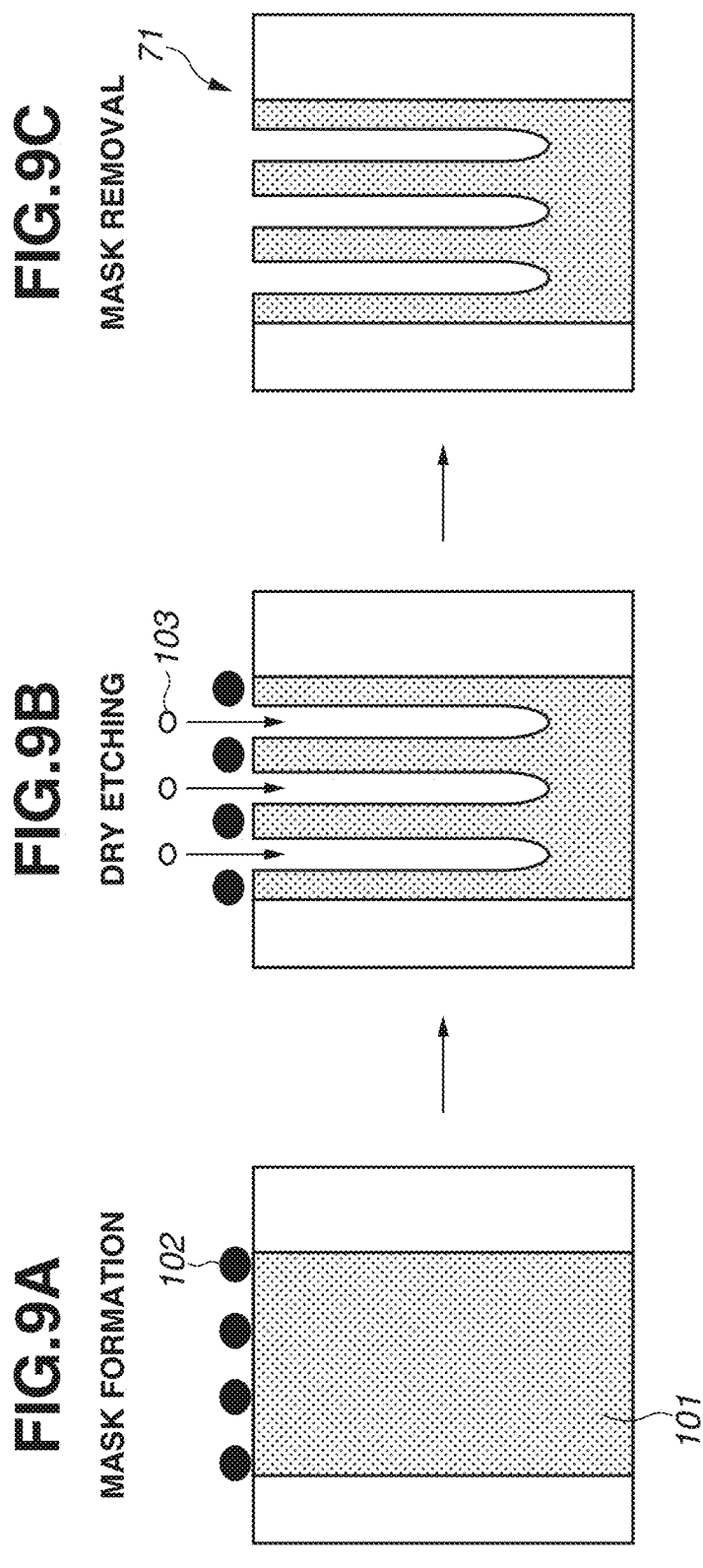

STRUCTURAL BODY, X-RAY GENERATION APPARATUS, X-RAY COMPUTED TOMOGRAPHY (CT) APPARATUS, AND MANUFACTURING METHOD FOR MANUFACTURING HEAT DISSIPATION PORTION

BACKGROUND OF THE INVENTION

Field of the Invention

The present invention relates to a structural body, an X-ray generation apparatus, an X-ray computed tomography (CT) apparatus, and a manufacturing method for manufacturing a heat dissipation portion.

Description of the Related Art

To a component that reaches a high temperature when used, a technique for increasing the heat dissipation property may be applied to decrease an amount of the heat accumulated in the component. For example, there is a technique for increasing the light absorption rate and improving the heat dissipation property by composing the surface of the component of a black material or applying or thermal-spraying the black material to the surface of the component.

International Patent Publication No. WO2020/067075 discusses a form in which a fin is provided on the surface of an X-ray tube target.

In the form of International Patent Publication No. WO2020/067075, the heat dissipation property is not sufficient, and there is room for consideration of an improvement in the heat dissipation property on the surface of a component.

SUMMARY OF THE INVENTION

The present invention is directed to providing a structural body in which the heat dissipation property is improved.

According to an aspect of the present invention, a structural body heated to 700° C. or more includes a heat dissipation portion configured to dissipate heat of the structural body, wherein, on a surface of the heat dissipation portion, a first concavo-convex structure is provided where a plurality of first convex portions and a plurality of first concave portions are alternately arranged, wherein, when the structural body is heated to 700° C. or more, a peak wavelength of an electromagnetic wave of heat emitted from the heat dissipation portion is 3 μm or less, and wherein a distance between first convex portions close to each other among the plurality of first convex portions, and/or a distance between first concave portions close to each other among the plurality of first concave portions is less than half of the peak wavelength.

Further features of the present invention will become apparent from the following description of exemplary embodiments with reference to the attached drawings.

BRIEF DESCRIPTION OF THE DRAWINGS

FIGS. 9A to 9C are diagrams illustrating the formation of a first concavo-convex structure in the heat dissipation portion using dry etching.

DESCRIPTION OF THE EMBODIMENTS

With reference to the drawings, a form for carrying out the present invention will be described below. The form described below, however, is an exemplary embodiment of the invention, and is not limited to this. Then, common components are described with reference to a plurality of drawings, and the descriptions of components designated by common signs are appropriately omitted. Different items with the same name can be distinguished from each other by adding "n-th" to the name as in a "first item" and a "second item".

Figure 1:
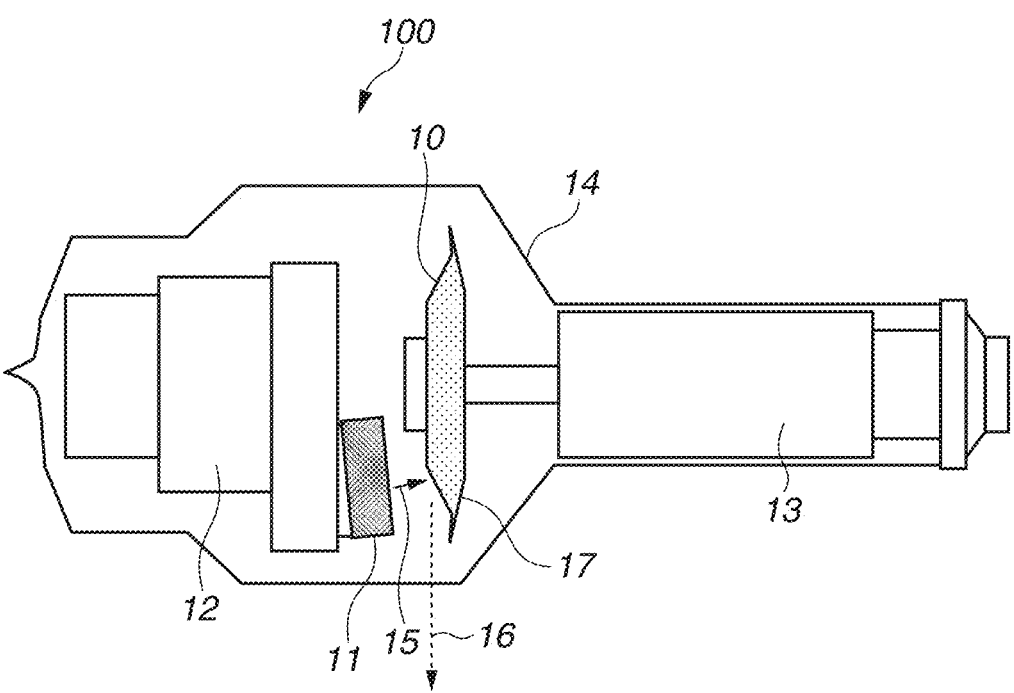
FIG. 1 is a schematic view of an X-ray generation apparatus (a rotating anode X-ray tube).
Figure 2A:
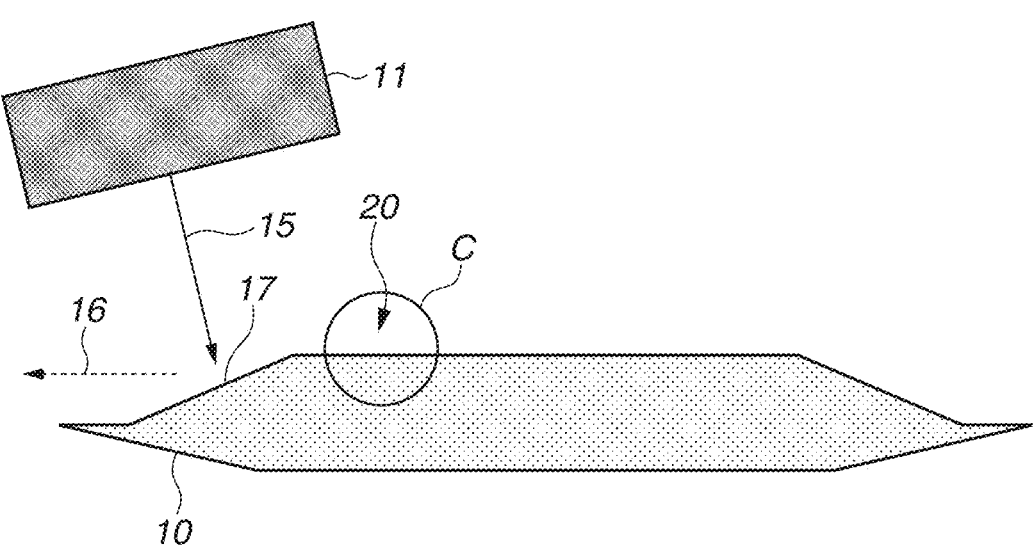
FIG. 2A is an enlarged view illustrating an electron tube target and an electron emission source in the X-ray generation apparatus in FIG. 1.
Figure 2B:
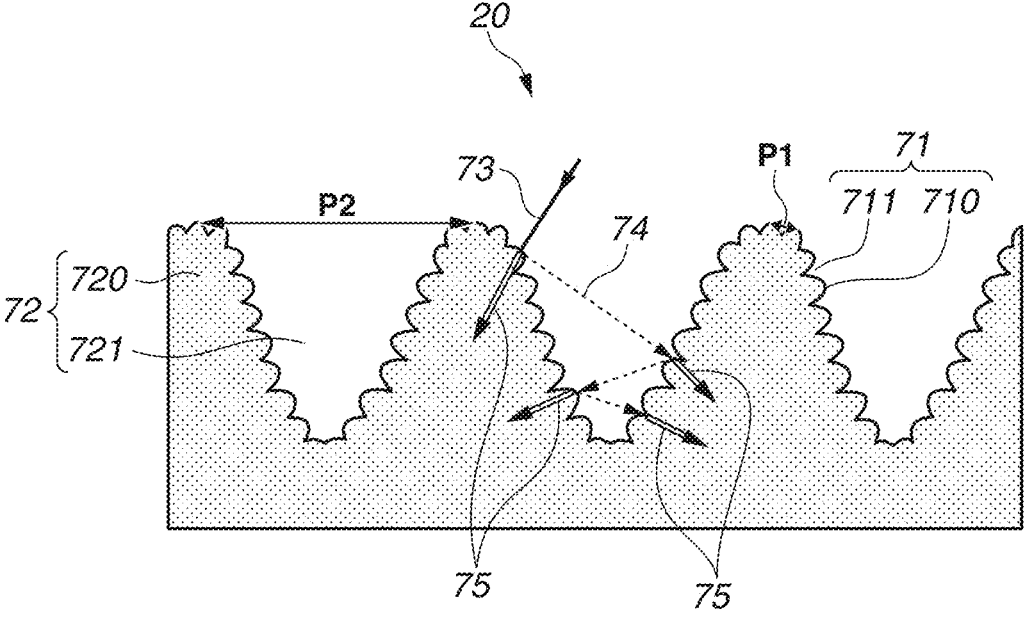
FIG. 2B is an enlarged view of a portion surrounded by a circle C in FIG. 2A.

With reference to FIGS. 1, 2A, and 2B, a structural body according to a first exemplary embodiment is described. The present exemplary embodiment illustrates an example where an electron tube target in an X-ray generation apparatus forms a structural body. FIG. 1 is a schematic view of an X-ray generation apparatus (a rotating anode X-ray tube). FIG. 2A is an enlarged view illustrating an electron tube target and an electron emission source in the X-ray generation apparatus in FIG. 1. FIG. 2B is an enlarged view of a portion surrounded by a circle C in FIG. 2A.

In FIG. 1, an X-ray generation apparatus 100 includes an electron emission source 11 provided in a cathode assembly 12 and an electron tube target (hereinafter occasionally referred to simply as "target") 10 attached to an anode shaft 13. The electron emission source 11 forms a cathode, and the target 10 forms an anode. These members are stored in a container 14 in a vacuum state. The target 10 is rotated together with the anode shaft 13 by, for example, a coil (not illustrated) provided outside the container 14.

An electron beam 15 emitted from the electron emission source 11 is focused by a focusing electrode (not illustrated), and the target 10 is irradiated with the electron beam 15. An X-ray 16 is generated from the target 10 irradiated with the electron beam 15, and the generated X-ray 16 is emitted from the container 14 to outside.

At this time, a part of the energy of the electron beam 15 with which the target 10 is irradiated is used to generate the X-ray 16, but most of the energy is absorbed by the target 10 and raises the temperature of the target 10.

To emit an X-ray at a high output, it is necessary to irradiate the target 10 with a large number of electron beams. This results in heating the target 10 to a high temperature. Thus, it is important to efficiently cool the target 10. However, since the target 10 is used in a vacuum, it is difficult to cool the target 10 using convection, and the target 10 is cooled using heat emission from the target 10 and heat conduction through the anode shaft 13. In the present exemplary embodiment, a structural body that efficiently emits heat is formed by providing a heat dissipation portion having concavo-convex structures in the target 10.

As a material forming the target 10, a high-melting-point metal that not only facilitates the emission of the X-ray 16 but also has a high heat resistance is desirable. Moreover, to stabilize the X-ray 16 to be emitted, a high-melting-point metal having a large heat capacity is desirable so that changes in the temperature of the target 10 can be prevented while the target 10 is being irradiated with the electron beam 15. Thus, it is desirable to use tungsten, molybdenum, niobium, tantalum, rhenium, hafnium, zirconium, or yttrium as the material of the target 10.

On the other hand, it is desirable that the inside of the container 14 should be in a vacuum state. The degree of vacuum can be appropriately used from a low vacuum (a pressure of 1.0E-5 Pa) to an absolute vacuum (a pressure of 0 Pa) according to the purpose. For example, in the case of the X-ray generation apparatus 100 according to the present exemplary embodiment, it is desirable that the pressure should be 1.0E-4 Pa to 1.0E-6 Pa.

FIG. 2A illustrates an enlarged view of a main portion of the X-ray generation apparatus illustrated in FIG. 1. As described above, the target 10 is irradiated with the electron beam 15 from the electron emission source 11. Then, the X-ray 16 is emitted from the target 10 irradiated with the electron beam 15. On the other hand, heat is generated in an irradiated area 17 of the target 10 irradiated with the electron beam 15, and the target 10 enters a high-temperature state at 1000° C. or more. Thus, in the present exemplary embodiment, a heat dissipation portion 20 having concavo-convex structures illustrated in FIG. 2B is provided on the external surface of the target 10 and dissipates at least a part of the heat generated in the irradiated area 17. The heat dissipation portion 20 may be provided in the entirety or a part of the external surface of the target 10. The irradiated area 17 of the target 10 irradiated with the electron beam 15 corresponds to "a component that can be a heat source". Since the electron beam 15 generates heat, the irradiated area 17 and the electron emission source 11 that emits the electron beam 15 to the irradiated area 17 can also be collectively regarded as "a component that can be a heat source".

Next, the structure of the heat dissipation portion 20 is described. FIG. 2B is an enlarged view of a portion surrounded by a circle C in FIG. 2A. As illustrated in FIG. 2B, the surface of the heat dissipation portion 20 according to the present exemplary embodiment has a first concavo-convex structure 71 where a plurality of first convex portions 710 and a plurality of first concave portions 711 are alternately arranged. The first concavo-convex structure 71 is formed so that the distance between first convex portions 710 close to each other among the plurality of first convex portions 710 and/or the distance between first concave portions 711 close to each other among the plurality of first concave portions 711 is a constant pitch P1. The distance between the first convex portions 710 close to each other is the distance from the top of a certain convex portion 710 to the top of a convex portion 710 close to the certain convex portion 710. Similarly, the distance between the first concave portions 711 close to each other is the distance from the bottom of a certain concave portion 711 to the bottom of a concave portion 711 close to the certain concave portion 711. On the surface of the heat dissipation portion 20, a second concavo-convex structure 72 where a plurality of second convex portions 720 and a plurality of second concave portions 721 are alternately arranged is also formed. The second concavo-convex structure 72 is formed so that the distance between second convex portions 720 close to each other among the plurality of second convex portions 720 and/or the distance between second concave portions 721 close to each other among the plurality of second concave portions 721 is a constant pitch P2. The pitch P2 is longer than the pitch P1, and the first concavo-convex structure 71 is formed on the surface of the second concavo-convex structure 72.

In the present exemplary embodiment, an example has been illustrated where the pitches P1 and P2 are constant. However, the distance between the first convex portions 710 close to each other and/or the distance between the first concave portions 711 close to each other (hereinafter referred to as a "distance L1") does not necessarily need to be constant. Similarly, the distance between the second convex portions 720 close to each other and/or the distance between the second concave portions 721 close to each other (hereinafter referred to as a "distance L2") does not necessarily need to be constant. In this case, the first concavo-convex structure 71 and the second concavo-convex structure 72 are formed so that the shortest distance among the distances L2 is longer than the longest distance among the distances L1.

In the present exemplary embodiment, the first concavo-convex structure 71 is formed so that the distance L1 between the first convex portions 710 close to each other and/or the distance L1 between the first concave portions 711 close to each other in the first concavo-convex structure 71 is less than half (½) of the peak wavelength of the electromagnetic wave of the heat emitted from the heat dissipation portion 20. This configuration improves the heat dissipation property of the heat dissipation portion 20. If, on the other hand, the distance L1 is greater than or equal to half (½) of the peak wavelength of the electromagnetic wave of the heat emitted from the heat dissipation portion 20, the heat dissipation property of the heat dissipation portion 20 decreases. The reason is considered as follows. As will be described below, to efficiently emit an electromagnetic wave at a wavelength λ generated by heat emission, a structure capable of, if an electromagnetic wave having the same wavelength λ as this electromagnetic wave is incident on the structure, absorbing the electromagnetic wave without reflecting the electromagnetic wave may be considered.

If the first concavo-convex structure 71 is regarded as a diffraction grating, the electromagnetic waves does not interfere with each other in the diffraction grating under the condition that the pitch P1 between the first convex portions 710 and/or the first concave portions 711 is less than or equal to half of the wavelength λ. This is a so-called subwavelength structure (hereinafter referred to as "SWS") and is a structure that does not reflect the electromagnetic wave at the wavelength λ.

The peak wavelength of the electromagnetic wave changes due to the temperature of a heating element that emits heat, i.e., the temperature of the target 10 (particularly, the heat dissipation portion 20) in the present exemplary embodiment, and is 3.00 μm at 700° C., 2.47 μm at 900° C., 1.84 μm at 1300° C., 1.63 μm at 1500° C., and 1.55 μm at 1600° C., for example. Thus, it is desirable to set the distance L1 between the first convex portions 710 close to each other and/or the distance L1 between the first concave portions 711 close to each other in the first concavo-convex structure 71 according to the use situation of the target 10. For example, in a case where the target 10 is used in a situation where the temperature of the heat dissipation portion 20 is 700° C., the distance L1 may be less than ½ of 3.00 μm. That is, it is desirable to form the first concavo-convex structure 71 so that the distance L1 is 50 nm or more and less than 1500 nm. For example, in a case where the target 10 is used in a situation where the temperature of the heat dissipation portion 20 is 900° C. to 1300° C., it is desirable to set the distance L1 based on the peak wavelength at 1300° C., which is the higher temperature. It is more desirable that the distance L1 should be less than ¼ of the peak wavelength of the electromagnetic wave of the emitted heat. For example, it is desirable that the distance L1 should be 200 nm or more and 600 nm or less.

In contrast, the distance L2 between the second convex portions 720 close to each other and/or the distance L2 between the second concave portions 721 close to each other in the second concavo-convex structure 72 may be greater than the distance L1 in the first concavo-convex structure 71. For example, it is desirable that the distance L2 should be 1 μm or more and 100 μm or less. It is more desirable that the distance L2 should be 10 μm or more and 50 μm or less. This can improve the heat dissipation property of the heat dissipation portion 20. The depth of concave portions 721 and/or the heigh of convex portions 720 may be 1 μm or more and 150 μm or less, and may be 10 μm or more and 100 μm or less.

A description is given below of the heat dissipation property of the heat dissipation portion 20 in which the first concavo-convex structure 71 and the second concavo-convex structure 72 are provided. The heat dissipation property of the heat dissipation portion 20 is correlated with the absorption property of the heat dissipation portion 20. It can be said that a heat dissipation portion having a high absorption property also has a high heat dissipation property. FIG. 2B illustrates an electromagnetic wave 73 incident on the heat dissipation portion 20, an electromagnetic wave 74 reflected by the heat dissipation portion 20, and an electromagnetic wave 75 penetrating in (and that may be absorbed in) the heat dissipation portion 20. If the pitch P1 between the first convex portions 710 and/or the first concave portions 711 in the first concavo-convex structure 71 is less than ½ of the peak wavelength of the emitted electromagnetic wave, the reflection of the electromagnetic wave 73 incident on the heat dissipation portion 20 is reduced due to the effect of the SWS, and it is possible to significantly improve the absorption rate of the electromagnetic wave 73. Thus, based on the above relationship between the absorption property and the heat dissipation property, it is possible to improve the heat dissipation property using the first concavo-convex structure 71.

On the other hand, a part of the electromagnetic wave 73 incident on the heat dissipation portion 20 is reflected into the second concave portions 721. The reflection of the reflected electromagnetic wave 74 is prevented due to the effect of the SWS by the first concavo-convex structure 71 formed on the surface of the second concavo-convex structure 72, but a part of the reflected electromagnetic wave 74 is further reflected into the second concave portions 721. As described above, it is possible to significantly reduce the reflectance due to the effects of the first concavo-convex structure 71 (the SWS) on the surface and the holes of the second concavo-convex structure 72. The reduction in the reflectance leads to an increase in the absorption rate, and as described above, there is a relationship where a heat dissipation portion having a high absorption rate also has a high heat dissipation property. Thus, it is possible to further increase the heat dissipation property by providing the second concavo-convex structure 72.

Such a heat dissipation property improvement mechanism also applies to a case where the distance L1 between the first convex portions 710 close to each other and/or the distance L1 between the first concave portions 711 close to each other is not constant as in the pitch P1. Also in a case where the distance L2 between the second convex portions 720 close to each other and/or the distance L2 between the second concave portions 721 close to each other is not constant as in the pitch P2, it is possible to similarly improve the heat dissipation property. In the present exemplary embodiment, an example has been illustrated where the first concavo-convex structure 71 is formed on the surface of the second concavo-convex structure 72. The second concavo-convex structure 72, however, does not necessarily need to be provided, and it is possible to improve the heat dissipation property due to the effect of the SWS so long as the first concavo-convex structure 71 is formed.

The shapes of the first convex portions 710 and/or the first concave portions 711 forming the first concavo-convex structure 71 are not particularly limited. It is, however, desirable that the first convex portions 710 should be formed of particles attached to the surface of the heat dissipation portion 20. The first convex portions 710 have shapes in which particles are deposited, whereby the surface area of the first convex portions 710 is greater than that of another shape, and it is possible to improve the absorption rate of the electromagnetic wave. Particularly, in the target 10 used under a use environment at 1000° C. or more, it is easy to form the first concavo-convex structure 71 where the pitch P1 is short by aggregating particles, and the effect of using the first concavo-convex structure 71 in combination with the second concavo-convex structure 72 also increases. When the first concavo-convex structure 71 has a form in which particles are deposited, the particle size of the particles can be regarded as equivalent to the pitch P1 in the first concavo-convex structure 71. Thus, the first concavo-convex structure 71 is formed so that the particle size of the particles forming the first concavo-convex structure 71 is smaller than ½ of the peak wavelength of the emitted electromagnetic wave.

Similarly, the depth of the first concavo-convex structure 71 can be regarded as equivalent to the particle size of the particles.

It is desirable that the first concavo-convex structure 71 should be formed of a metal having a high X-ray emission efficiency, a high melting point, and a large heat capacity. The metal having a high melting point is a metal having a melting point of 1500° C. or more. As such a metal, tungsten is desirable, and molybdenum, niobium, tantalum, rhenium, hafnium, zirconium, or yttrium, which has a large heat capacity, is also suitable.

In a case where the first concavo-convex structure 71 is formed of a metal having a high melting point, it is desirable that the amount of nitrogen contained in a portion from the surface to a depth of 100 nm or less in the first concavo-convex structure 71 should be 1 at % (where "at %" signifies atomic percentage) or more, or the amount of oxygen contained in the portion should be 10 at % or less. For example, in a case where the first concavo-convex structure 71 is processed by a method as described below, and if the first concavo-convex structure 71 is processed under a nitrogen atmosphere, 1 at % or more of nitrogen is incorporated into the surface and contributes to an improvement in the emissivity. If a large amount of oxygen is included in the high-melting-point metal, the melting point may decrease. Thus, it is desirable that the amount of contained oxygen should be 10 at % or less. The amount of contained nitrogen and the amount of contained oxygen do not necessarily need to be in the above ranges, and may be in appropriate ranges according to the purpose.

Figure 3:
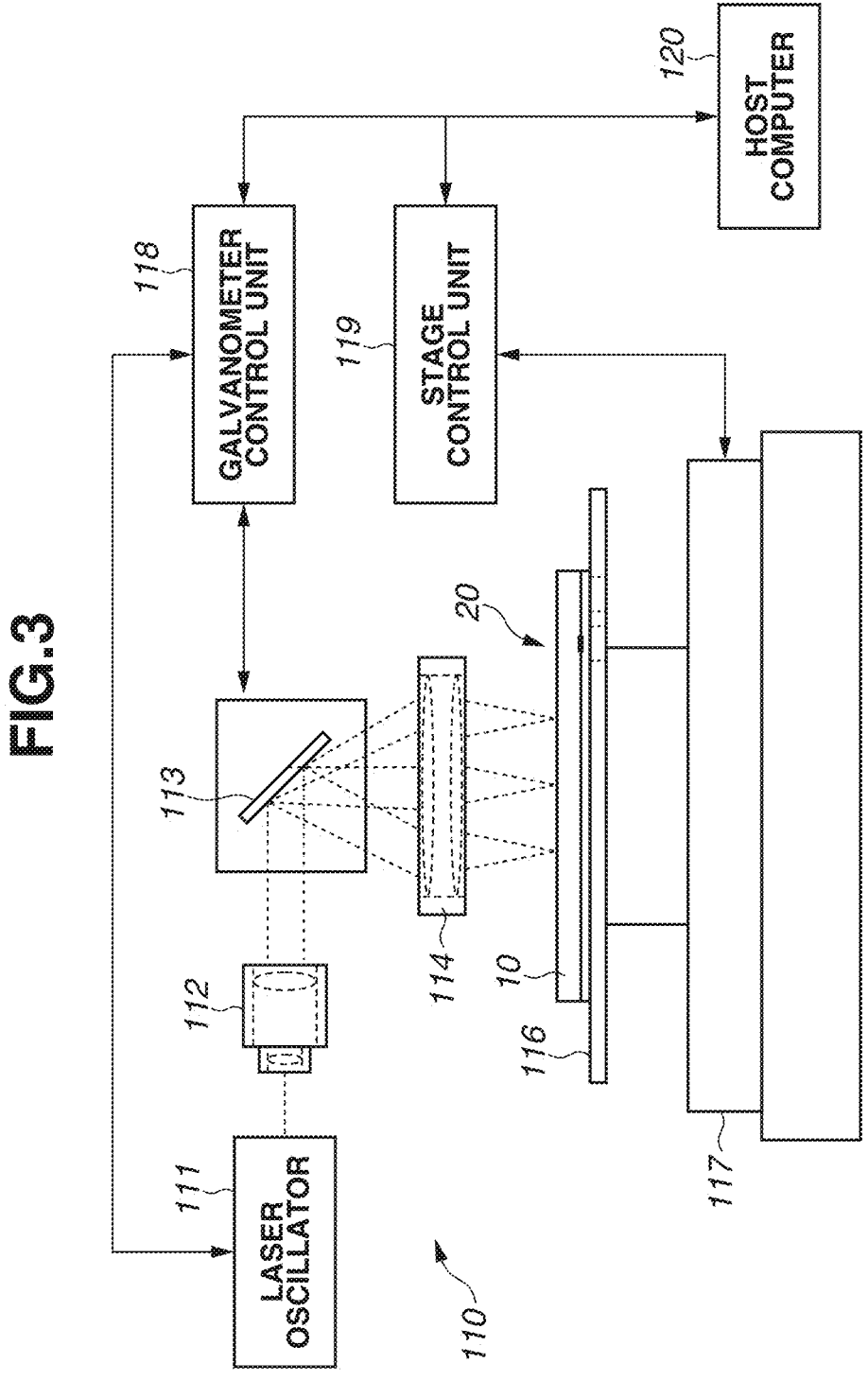
FIG. 3 is a schematic diagram illustrating a laser processing machine for manufacturing a heat dissipation portion.
Figure 4:
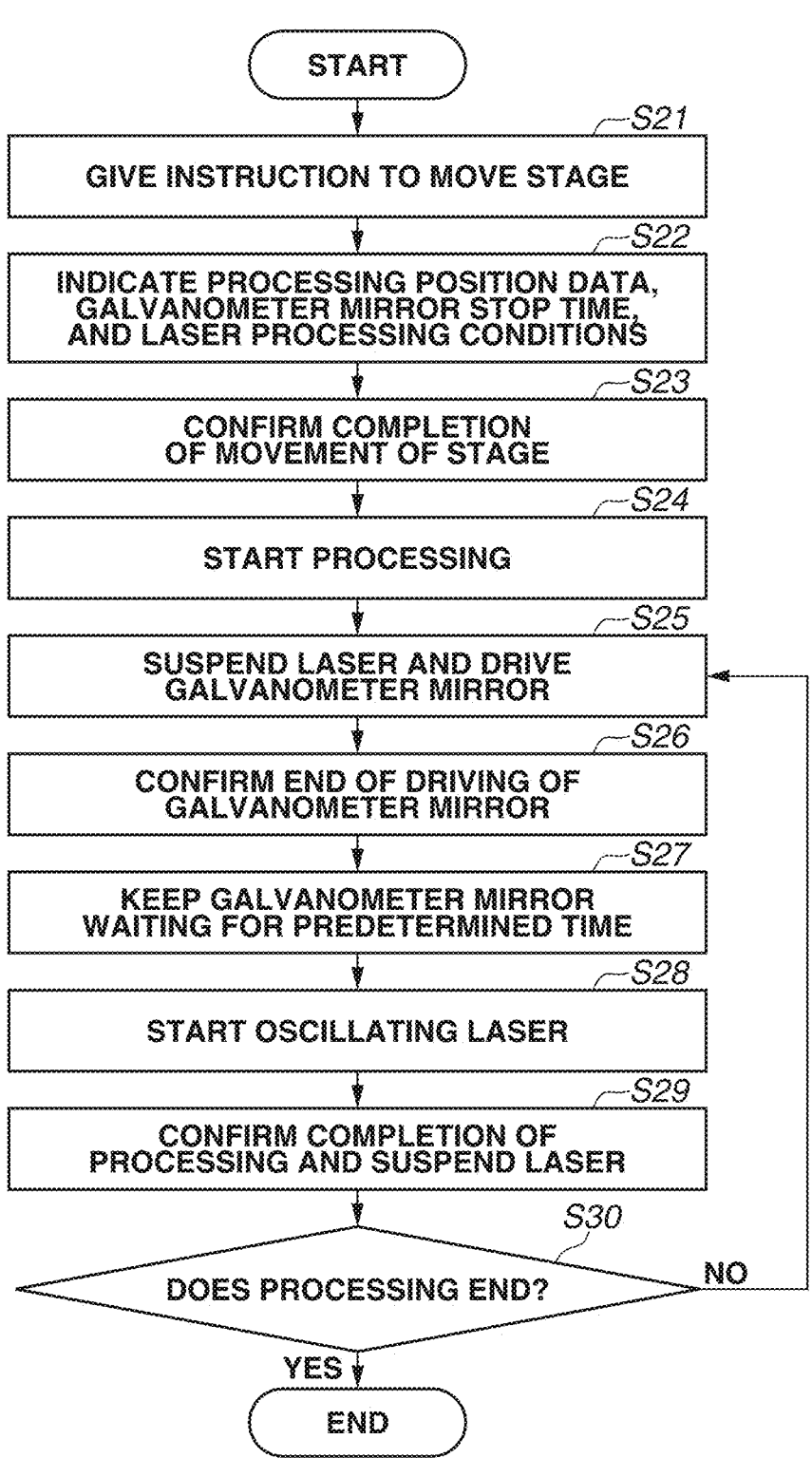
FIG. 4 is a flowchart illustrating processes for laser-processing the heat dissipation portion.

Next, with reference to FIGS. 3 and 4, a manufacturing method for manufacturing the heat dissipation portion 20 according to the present exemplary embodiment is described. FIG. 3 is a schematic diagram illustrating a laser processing machine 110 for manufacturing the heat dissipation portion 20. The surface of a member such as the target 10 according to the present exemplary embodiment is processed to partially remove a metal of the member with laser light using the laser processing machine 110 (i.e. laser ablation), thereby processing the heat dissipation portion 20 into a shape like the second concavo-convex structure 72 (hereinafter, the target 10 will occasionally be referred to as a "processing target member" in the sense that the target 10 is a member in which the heat dissipation portion 20 is formed). On the other hand, a metal removed from the processing target member becomes metal particles, and the metal particles deposit on the surface of the second concavo-convex structure 72, thereby forming the first concavo-convex structure 71 (see FIG. 2B). Thus, the distance L1 between the first convex portions 710 close to each other and/or the distance L1 between the first concave portions 711 close to each other in the first concavo-convex structure 71 is not constant. Further, the particle size of the deposited metal particles does not need to be constant. It is desirable that there should be particles in which the difference between the maximum particle size and the minimum particle size is 300 nm or more. This can randomly cause reflection in the first concavo-convex structure 71 and improve the absorption rate of the first concavo-convex structure 71. It is desirable that the particle size of the particles should be 50 nm or more and less than 1500 nm. Thus, it is desirable that the depth of the first concavo-convex structure 71 should also be 50 nm or more and less than 1500 nm.

In the laser processing machine 110 illustrated in FIG. 3, the beam diameter of laser light emitted from a laser oscillator 111 is enlarged by a beam expander 112. Then, the laser light is reflected by a galvanometer mirror 113, is incident on an FO lens 114, and is collected on the target (processing target member) 10 in which the heat dissipation portion 20 is formed. The target (processing target member) 10 is fixed to a fixing table 116 and can be freely moved using a movable stage 117.

A galvanometer control unit 118 controls the laser oscillator 111 and the galvanometer mirror 113.

FIG. 3 illustrates an example where a single galvanometer mirror 113 is provided. However, in a case where laser light is controlled in two axial directions, two mirrors are required. The number of mirrors can be appropriately selected according to the purpose.

A stage control unit 119 controls the movable stage 117. In a case where autofocus is performed, based on a signal from a displacement meter (not illustrated), the stage control unit 119 controls the movable stage 117 to move up and down so that the distance between the laser light collection position and the target (processing target member) 10 is constant. A host computer 120 includes a user interface and a processing data storage unit and can control the galvanometer control unit 118 and the stage control unit 119 in conjunction with each other at a predetermined timing. Although not illustrated, the movable stage 117 and the target (processing target member) 10 are installed in an environment box, and laser processing can be performed in an environment where the oxygen concentration is controlled to be 0.5% or less.

Next, with reference to a flowchart illustrated in FIG. 4, processes for laser-processing the heat dissipation portion 20 according to the present exemplary embodiment are described. First, after the target (processing target member) 10 is fixed onto the fixing table 116, position information required for the processing is acquired by reading an alignment mark, and the laser processing position is corrected, thereby making preparations for the processing.

In the flowchart in FIG. 4, first, in step S21, the stage control unit 119 is instructed to move the fixing table 116 to a desired position. Next, in step S22, processing position data, a galvanometer mirror stop time, and laser processing conditions are indicated to the galvanometer control unit 118. In step S23, the completion of the movement of the movable stage 117 is confirmed. In step S24, the processing is started. In the processing process, first, in step S25, in the state where the oscillation of the laser is suspended, the galvanometer mirror 113 is driven so that laser light is emitted to a desired position when the laser is oscillated. Next, in step S26, the end of the driving of the galvanometer mirror 113 is confirmed. Then, in step S27, the galvanometer mirror 113 is stopped and kept waiting for the time set in advance. Next, in step S28, the laser is oscillated, and the second concavo-convex structure 72 is processed. During the processing, the target (processing target member) 10 is irradiated with laser light emitted from the laser for a desired time or with a desired number of pulses. Next, in step S29, the completion of the processing of a single second concave portion 721 is confirmed (see FIG. 2B), and the oscillation of the laser is suspended. Next, in step S30, it is determined whether all the processing of an area that can be processed by the galvanometer mirror 113 ends. Then, if all the processing does not end (No in step S30), the operation returns to step S25, and the processing is continued. If, on the other hand, all the processing of the area that can be processed by the galvanometer mirror 113 ends (Yes in step S30), the processing of the above area ends. If the heat dissipation portion 20 can be manufactured only by the processing of the above area, the manufacturing processes end. If, however, another area needs to be processed, the operation returns to the process of step S21.

In the present exemplary embodiment, using the laser processing machine 110, it is possible to form concavo-convex structures at predetermined positions on the surface of the target (processing target member) 10 by preventing oxidation. If a femtosecond laser is used as the laser oscillator 111, it is also possible to laser-process a high-melting-point metal such as tungsten or molybdenum by preventing oxidation. As described above, evaporated molecules of the target (processing target member) 10 evaporated by irradiating the target (processing target member) 10 with laser light for a desired time or with a desired number of pulses are aggregated in a gas phase and attached as particles to the surface of the target (processing target member) 10. The attached particles form an SWS and can improve the emissivity of the target 10. It is desirable that the SWS should be a concavo-convex structure where the pitch and/or the distance between convex portions (the distance between concave portions) is less than ½ of the peak wavelength of the electromagnetic wave of emitted heat, and should be a structure having a depth three times or more the pitch and/or the distance. With this structure, a change in the depth direction of the refractive index of an interface relative to the peak wavelength of the electromagnetic wave of the emitted heat is gradual, whereby it is possible to effectively prevent the reflection of the electromagnetic wave and improve the emissivity. Even in a case where the function of the SWS as the first concavo-convex structure 71 is insufficient, the first concavo-convex structure 71 is used in combination with the second concavo-convex structure 72, whereby it is possible to improve the emissivity. Further, although the oxidation of the processed surface may decrease a melting point of the processed surface, it is possible to prevent the oxidation of the processed surface by using the laser processing machine 110, and therefore, also when the temperature of the target 10 composed of a high-melting-point metal rises to near the melting point, it is possible to prevent a fine structure from being lost due to melting in the decreased melting point of the processed surface and prevent a decrease in the emissivity. That is, it is possible to maintain the emissivity even under a use environment where the target 10 reaches a high temperature, and effectively utilize radiative cooling.

In the present exemplary embodiment, a description has been given of a form in which the heat dissipation portion 20 is processed by intermittently stopping the galvanometer mirror 113. Alternatively, the processing may be performed by continuously scanning laser light while causing the laser light to blink without stopping the galvanometer mirror 113.

Figure 5:
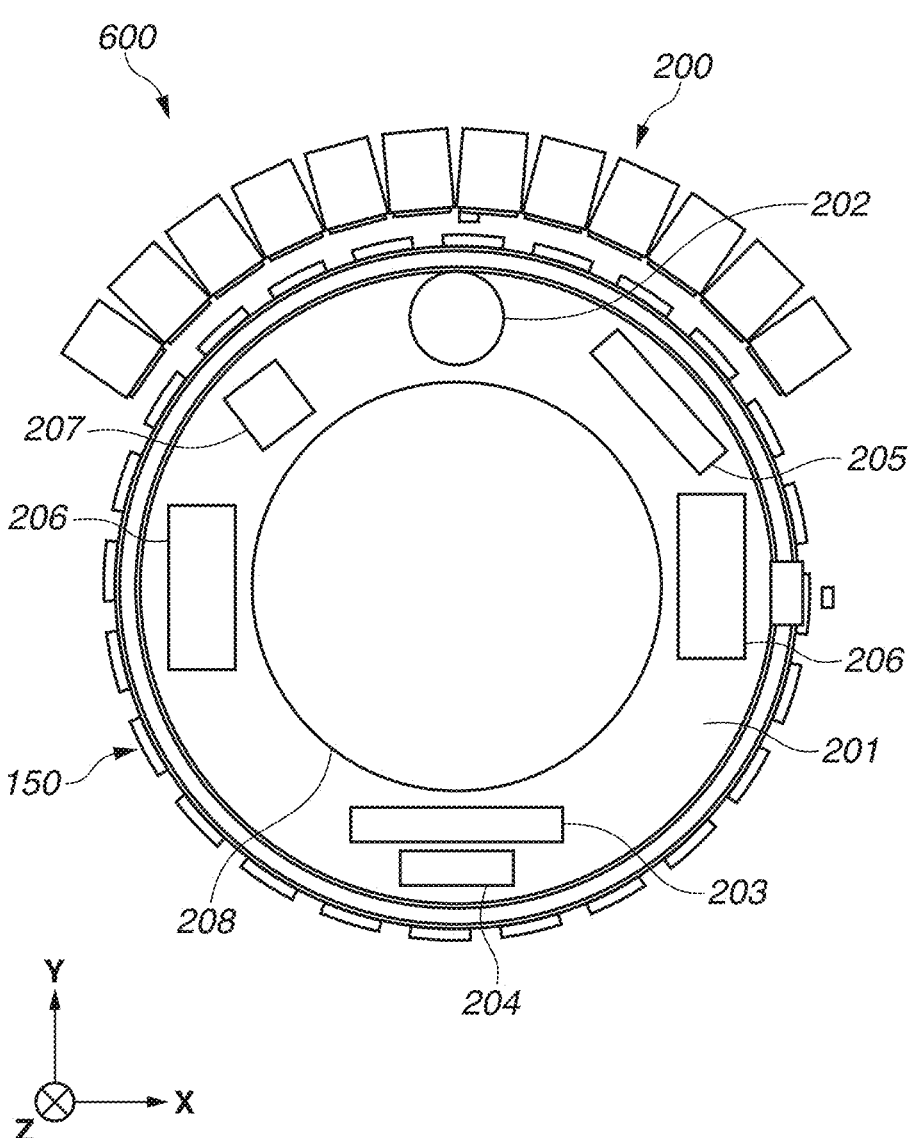
FIG. 5 is a schematic view of a computed tomography (CT) apparatus to which the X-ray generation apparatus according to a first exemplary embodiment is applied.

For example, the X-ray generation apparatus 100 according to the present exemplary embodiment can be used in an X-ray computed tomography (CT) apparatus illustrated in FIG. 5. FIG. 5 is a cross-sectional view of an X-ray CT apparatus 600. The X-ray CT apparatus 600 includes a stator 200 and a rotor 150 and is configured so that the rotor 150 rotates about a Z-axis as a rotational axis relative to the stator 200.

The X-ray CT apparatus 600 includes a plate-like portion 201, an X-ray emission unit 202, an X-ray detection unit 203, a signal amplification unit 204, a cooling unit 205, a power supply unit 206, and a power supply control unit 207. Each of the plate-like portion 201, the X-ray emission unit 202, the X-ray detection unit 203, the signal amplification unit 204, the cooling unit 205, the power supply unit 206, and the power supply control unit 207 is a component installed in the rotor 150.

The plate-like portion 201 is an annular plate-like member installed inside the cylindrical rotor 150. In the center of the plate-like portion 201, an imaging opening 208 into which a subject such as a human being or another living object as a target of X-ray CT is inserted is provided.

The form of inserting the subject into the imaging opening 208 is not particularly limited. For example, the subject is inserted into the imaging opening 208 by sliding a bed (not illustrated) on which the subject lies into the imaging opening 208 along the Z-direction of the imaging opening 208. The subject is not necessarily limited to a living object such as a human being, and may be an article such as an industrial product.

Each of the X-ray emission unit 202, the X-ray detection unit 203, the signal amplification unit 204, the cooling unit 205, the power supply unit 206, and the power supply control unit 207 is installed by being attached to one surface of the plate-like portion 201 in the Z-direction. The X-ray emission unit 202, the X-ray detection unit 203, the signal amplification unit 204, the cooling unit 205, the power supply unit 206, and the power supply control unit 207 rotate about the Z-axis as a rotational axis by the rotation of the plate-like portion 201 associated with the rotation of the rotor 150 by a rotational driving apparatus (not illustrated). These units may be attached to one or the other surface or both surfaces of the plate-like portion 201 in the Z-direction. These units may be placed between a plurality of coil rows.

The X-ray emission unit 202 and the X-ray detection unit 203 are installed on the same surface of the plate-like portion 201 in the Z-direction. The X-ray emission unit 202 and the X-ray detection unit 203 are placed to be opposed to each other across the Z-axis as the rotational axis of the annular plate-like portion 201 in the diameter direction of the annular plate-like portion 201.

The X-ray emission unit 202 is an emission unit that emits an X-ray as radiation toward the subject while the rotor 150 rotates around the subject once. For example, the X-ray emission unit 202 is the X-ray generation apparatus 100. The power supply unit 206 is a power supply apparatus that supplies a voltage for emitting the X-ray, such as a tube voltage for an X-ray tube, to the X-ray emission unit 202. The power supply control unit 207 is a control apparatus that controls the supply of the tube voltage from the power supply unit 206. The cooling unit 205 is a cooling apparatus that cools the X-ray emission unit 202 that generates heat when emitting the X-ray.

The X-ray detection unit 203 is a detector that detects the X-ray emitted from the X-ray emission unit 202 toward the subject and being transmitted through (passing through) the subject. The X-ray detection unit 203 outputs a detection signal according to the detected X-ray. The signal amplification unit 204 amplifies the detection signal output from the X-ray detection unit 203.

The signal amplification unit 204 outputs the amplified detection signal to a system control unit (not illustrated). The system control unit generates an X-ray CT image by image processing based on the detection signal from the signal amplification unit 204.

Figure 6:
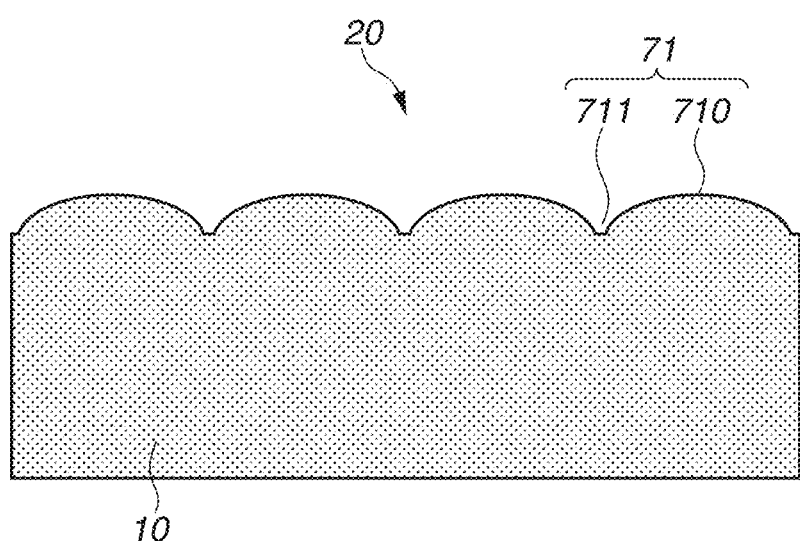
FIG. 6 is a diagram illustrating a target according to a second exemplary embodiment.

With reference to FIG. 6, the target 10 according to a second exemplary embodiment is described. The heat dissipation portion 20 according to the present exemplary embodiment is different from that according to the first exemplary embodiment in that only the first concavo-convex structure 71 is formed, and the second concavo-convex structure 72 is not formed.

In the present exemplary embodiment, FIG. 6 is an enlarged view of the range surrounded by the circle C in FIG. 2A. Even in a case where the second concavo-convex structure 72 is not included as described above, it is possible to improve the heat dissipation property using the first concavo-convex structure 71 alone. The mechanism for improving the heat dissipation property using the first concavo-convex structure 71 is similar to that in the first exemplary embodiment.

The heat dissipation portion 20 according to the present exemplary embodiment can be produced using the laser processing machine 110 illustrated in FIG. 3 similarly to the first exemplary embodiment. In the present exemplary embodiment, however, the first concavo-convex structure 71 is formed by processing the surface of the target (processing target member) 10 to a desired depth with laser light, instead of depositing molecules evaporated with laser light as in the first exemplary embodiment. Thus, regarding the first concavo-convex structure 71 according to the present exemplary embodiment, it is possible to set the distance L1 between the first convex portions 710 close to each other and/or the distance L1 between the first concave portions 711 close to each other to a constant value as in the pitch P1. The first concavo-convex structure 71 according to the present exemplary embodiment may be formed by lithography (dry etching using a mask), instead of laser processing. Further, as the formation method for forming the first concavo-convex structure 71, a method for depositing particles on the surface of the target (processing target member) 10 by physical vapor deposition or chemical vapor deposition can also be used.

EXAMPLES

Next, the present invention is described in further detail by citing targets formed under various processing conditions as examples and a comparative example. The present invention, however, is not limited to the following examples.

Example 1-1

In example 1-1, a member composed of tungsten was surface-treated using the laser processing machine 110 described with reference to FIG. 3. Nitrogen gas was supplied into the environment box of the laser processing machine 110, and the member composed of tungsten was installed under a nitrogen environment where the oxygen concentration was maintained at 0.5% or less. The processing conditions were a laser wavelength of 1064 nm, a laser output of 4 W, a pulse width of 258 fs, and an oscillation frequency of 200 kHz. A plurality of holes was formed on the surface of the member so that the pitch P2 between the convex portions and/or the concave portions was 40 μm. The irradiation time per hole was 5000 μs. The second concavo-convex structure 72 was formed of this series of holes, and the first concavo-convex structure 71 was formed by the deposition of the member (particles) produced by laser processing (see FIG. 2B). After the deposition of the particles, heat treatment at 1100° C. was performed in hydrogen, thereby reducing oxygen incorporated into the surface of the member and stabilizing the structures under a use environment at a high temperature. This treatment is performed, whereby it is possible to stably obtain a high emissivity even under a use environment at a high temperature of 1000° C. or more. It is desirable to perform the heat treatment at 800° C. or more.

Figure 7A:
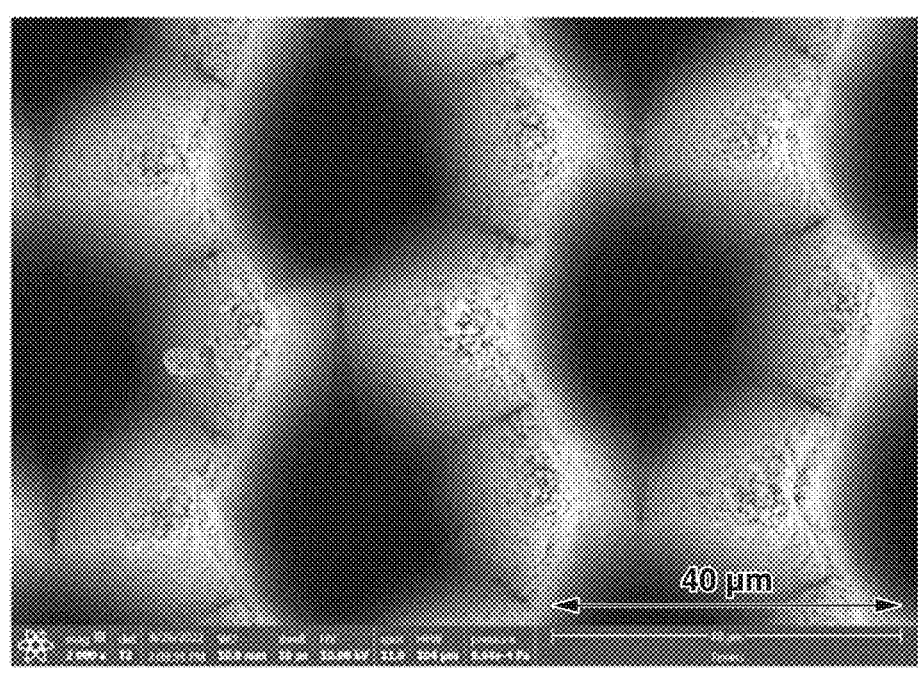
FIG. 7A illustrates an enlarged photograph of a surface of a member before heat treatment.
Figure 7B:
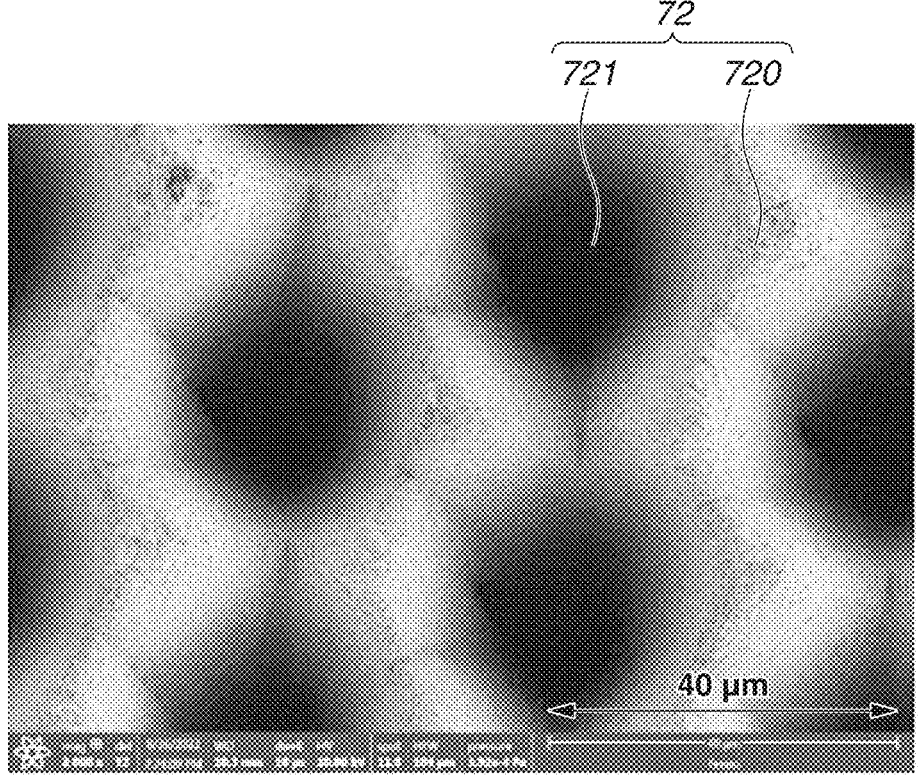
FIG. 7B illustrates an enlarged photograph of the surface of the member after the heat treatment.

FIGS. 7A and 7B and FIGS. 8A and 8B illustrate scanning electron microscope (SEM) photographs (photographs as substitutes for drawings) obtained by enlarging the surface of the member composed of tungsten before and after the heat treatment in the present exemplary embodiment. FIG. 7A illustrates an enlarged photograph of the surface of the member before the heat treatment, and FIG. 7B illustrates an enlarged photograph of the surface of the member after the heat treatment. As illustrated in FIGS. 7A and 7B, the concave portions 721 of the second concavo-convex structure 72 were arranged in a honeycomb manner, and the depth of each concave portion 721 was 70 μm.

Figure 8A:
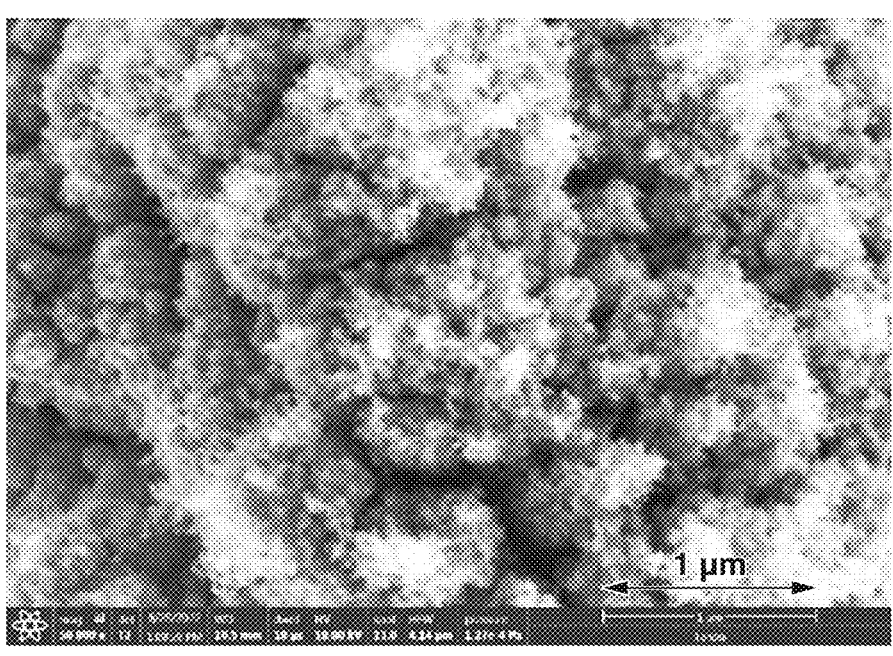
FIG. 8A illustrates a scanning electron microscope (SEM) photograph (a photograph as a substitute for a drawing) obtained by further enlarging FIG. 7A.
Figure 8B:
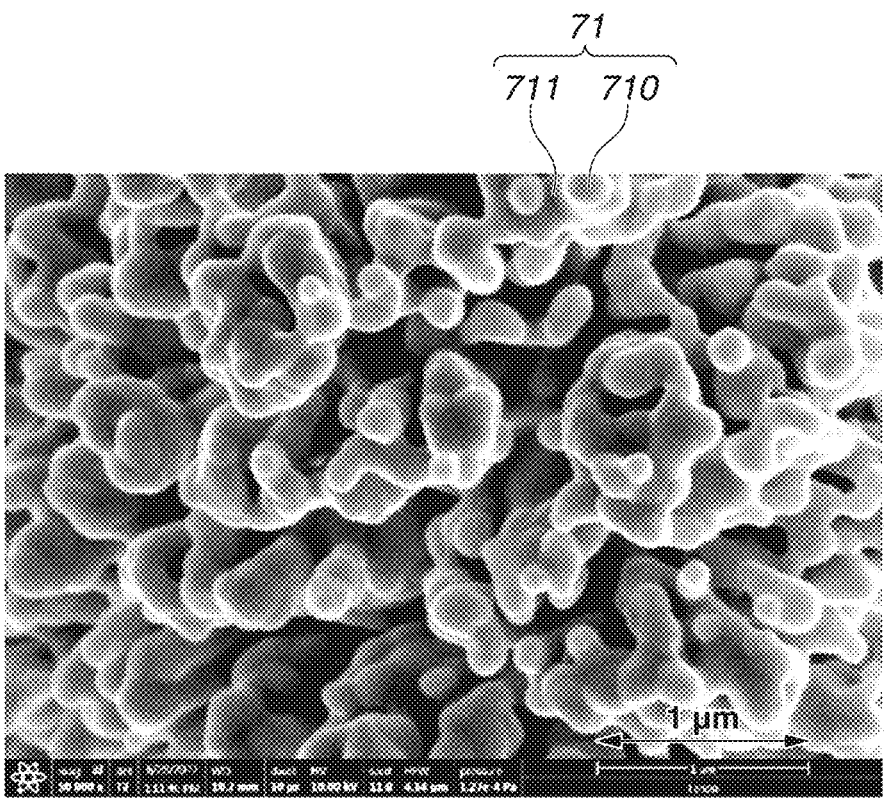
FIG. 8B illustrates an SEM photograph (a photograph as a substitute for a drawing) obtained by further enlarging FIG. 7B.

FIG. 8A illustrates an SEM photograph (a photograph as a substitute for a drawing) obtained by further enlarging FIG. 7A, and FIG. 8B illustrates an SEM photograph (a photograph as a substitute for a drawing) obtained by further enlarging FIG. 7B. The first concavo-convex structure 71 after the heat treatment was a structure where particles were deposited, and the distance L1 between the first convex portions 710 close to each other varied from 110 nm to 580 nm. The average of the distance L1 was 360 nm. The emissivity after the heat treatment was 0.55.

Example 1-2

In example 1-2, the member was surface-treated under conditions similar to those in example 1-1 except that a plurality of holes was formed on the surface of the member so that the pitch P2 between the convex portions and/or the concave portions was 30 μm. The emissivity after the heat treatment was 0.86.

Example 1-3

In example 1-3, the member was surface-treated under conditions similar to those in example 1-2 except that laser processing was performed in the atmospheric air. The first concavo-convex structure 71 after the heat treatment was a structure where particles were deposited, and the distance L1 between the first convex portions 710 close to each other varied from 100 nm to 590 nm. The average of the distance L1 was 310 nm. The emissivity after the heat treatment was 0.65.

Comparative Example

In comparative example, the member composed of tungsten was not surface-treated, and was only heat-treated.

Thus, the surface of the member did not have first and second concavo-convex structures. The emissivity after the heat treatment was 0.08.

(Evaluation Results)

Table 1 illustrates the processing conditions and the emissivity in examples 1-1 to 1-3 and comparative example. The emissivity was greatly improved by providing holes of a desired size. Particularly in example 1-2, the emissivity was more improved than in example 1-1 by making the pitch P2 in the second concavo-convex structure 72 small.

In examples 1-1 and 1-2, laser processing was performed in a nitrogen environment to reduce the oxygen concentration. Alternatively, inert gas such as argon or helium, which does not form a compound that decreases the melting point or has a sublimation property by reaction with the target material, may be used.

TABLE 1

| List of control commands | Example 1-1 | Example 1-2 | Example 1-3 | Comparative Example |
|---|---|---|---|---|
| Processing atmosphere | in nitrogen | in nitrogen | in atmospheric air | — |
| Pitch P1 | 110 nm-580 nm | 100 nm-590 nm | 160 nm-520 nm | |
| Average of pitch P1 | 360 nm | 310 nm | 450 nm | |
| Pitch P2 | 40 μm | 30 μm | 30 μm | |
| Laser wavelength | 1064 nm | 1064 nm | 1064 nm | — |
| Laser output | 4 W | 4 W | 4 W | — |
| Pulse width | 258 fs | 258 fs | 258 fs | — |
| Oscillation frequency | 200 kHz | 200 kHz | 200 kHz | — |
| Irradiation time/hole | 5000 μs | 5000 μs | 5000 μs | — |
| Heating treatment temperature in hydrogen | 1100° C. | 1100° C. | 1100° C. | 1100° C. |
| Emissivity | 0.55 | 0.86 | 0.65 | 0.08 |

Example 2

In example 2, the first concavo-convex structure 71 was formed in the heat dissipation portion 20 using dry etching.

As illustrated in FIG. 9A, gold nanoparticles 102 were applied onto a member 101 composed of tungsten. Then, as illustrated in FIG. 9B, argon (Ar) ions 103 generated and accelerated by an Ar ion source were emitted, and the member 101 was dry-etched using the nanoparticles 102 as a mask. After the member 101 was processed to a depth of 900 nm, then as illustrated in FIG. 9C, the mask was removed, and the first concavo-convex structure 71 where the pitch P1 was 300 nm was formed in the member 101, thereby manufacturing the heat dissipation portion 20. The emissivity was 0.70.

The first concavo-convex structure 71 is formed in the heat dissipation portion 20 composed of a high-melting-point metal, whereby it is possible to prevent a decrease in the emissivity even if the temperature of the heat dissipation portion 20 rises to near the melting point. That is, it is possible to maintain the emissivity even under a use environment at a high temperature and effectively utilize radiative cooling. It is also possible to form an etching mask using a photolithography process instead of the gold nanoparticles 102.

In the above exemplary embodiments, a target used in an X-ray generation apparatus has been cited as a structural body. The structural body according to the present invention, however, is not limited to this, and can be applied to various articles. For example, the structural body can also be used in a housing surrounding an electronic component, as a method for letting out heat in an electronic device such as a personal computer (PC). Alternatively, the structural body may be obtained by providing concavo-convex structures as in the present invention on the surface of a heat dissipation sheet. The above exemplary embodiments can be appropriately changed without departing from their technical ideas. A plurality of exemplary embodiments can be combined together. Some items in at least one exemplary embodiment can be deleted or replaced. Further, a new item can be added to at least one exemplary embodiment.

The disclosed content of the specification includes not only items explicitly described in the specification but also all items that can be understood from the specification and the drawings attached to the specification. The disclosed content of the specification includes a complement of individual concepts described in the specification. That is, for example, if the specification states that "A is larger than B", and even if the specification omits the statement that "A is not larger than B", the specification can be said to state that "A is not larger than B". This is because the statement that "A is larger than B" is based on the premise of the consideration that "A is not larger than B".

Based on the structural body according to the present invention, it is possible to improve the heat dissipation property.

While the present invention has been described with reference to exemplary embodiments, it is to be understood that the invention is not limited to the disclosed exemplary embodiments. The scope of the following claims is to be accorded the broadest interpretation so as to encompass all equivalent structures and functions.

This application claims the benefit of Japanese Patent Application No. 2023-027317, filed Feb. 24, 2023, which is hereby incorporated by reference herein in its entirety.

What is claimed is:

1. A structural body heated to 700° C. or more, the structural body comprising:

a heat dissipation portion configured to dissipate heat of the structural body, wherein, on a surface of the heat dissipation portion, the structural body is provided with a first concavo-convex structure is provided where a plurality of first convex portions and a plurality of first concave portions are alternately arranged, and with a second concavo-convex structure where a plurality of second convex portions and a plurality of second concave portions are alternately arranged, wherein the first concavo-convex structure is provided on a surface of the second concavo-convex structure, wherein, when the structural body is heated to 700° C. or more, a peak wavelength of an electromagnetic wave of heat emitted from the heat dissipation portion is 3 μm or less, and wherein a distance between first convex portions close to each other among the plurality of first convex portions, and/or a distance between first concave portions close to each other among the plurality of first concave portions, is/are 50 nm or more but less than half of the peak wavelength, wherein a distance between second convex portions close to each other among the plurality of second convex portions is longer than the distance between the first convex portions, and/or a distance between second concave portions close to each other among the plurality of second concave portions is longer than the distance between the first concave portions, and wherein the distance between second convex portions and/or the distance between second concave portions is/are 1 μm or more and 100 μm or less.

2. The structural body according to claim 1, wherein the first concavo-convex structure is composed of a material having a melting point of 1500° C. or more.

3. The structural body according to claim 1, wherein the second concavo-convex structure is composed of a metal having a melting point of 1500° C. or more.

4. The structural body according to claim 1, wherein the distance between the second convex portions and/or the distance between the second concave portions is/are 10 μm or more.

5. The structural body according to claim 1, wherein a depth of the first concavo-convex structure is 50 nm or more but less than 1500 nm.

6. The structural body according to claim 1, wherein the second concavo-convex structure is composed of tungsten, molybdenum, niobium, tantalum, rhenium, hafnium, zirconium, or yttrium.

7. The structural body according to claim 1, wherein the first concavo-convex structure includes particles, and a particle size of the particles is 50 nm or more but less than 1500 nm.

8. A structural body heated to 700° C. or more, the structural body comprising:

an area configured to be irradiated with an electron; and a heat dissipation portion configured to dissipate heat of the structural body, wherein the structural body forms an electron tube target, wherein on a surface of the heat dissipation portion, the structural body is provided with a first concavo-convex structure where a plurality of first convex portions and a plurality of first concave portions are alternately arranged, and with a second concavo-convex structure where a plurality of second convex portions and a plurality of second concave portions are alternately arranged, wherein the first concavo-convex structure is provided on a surface of the second concavo-convex structure, wherein a distance between first convex portions close to each other among the plurality of first convex portions or a distance between first concave portions close to each other among the plurality of first concave portions is less than ½ of a peak wavelength of an electromagnetic wave of heat emitted from the heat dissipation portion, and wherein a distance between second convex portions close to each other among the plurality of second convex portions is longer than the distance between the first convex portions, and/or a distance between second concave portions close to each other among the plurality of second concave portions is longer than the distance between the first concave portions.

9. The structural body according to claim 8, wherein the distance between the first convex portions and/or the distance between the first concave portions is/are 50 nm or more.

10. The structural body according to claim 8, wherein the first concavo-convex structure is arranged apart from the area.

11. An X-ray generation apparatus comprising:
the structural body according to claim 8; and
an electron emission source configured to emit electrons to the electron tube target.

12. The structural body according to claim 8, wherein a depth of the first concavo-convex structure is 50 nm or more but less than 1500 nm.

13. The structural body according to claim 9, wherein the distance between second convex portions and/or the distance between second concave portions is/are 1 μm or more and 100 μm or less.

14. The structural body according to claim 13, wherein the distance between the second convex portions and/or the distance between the second concave portions is/are 10 μm or more.

15. An X-ray generation apparatus comprising:
the structural body according to claim 10; and
a container storing the structural body inside the container.

16. An X-ray computed tomography (CT) apparatus comprising:
the X-ray generation apparatus according to claim 15; and
a detection unit configured to detect an X-ray emitted from the X-ray generation apparatus.

17. The X-ray generation apparatus according to claim 15, wherein an inside of the container is in a vacuum state.

18. The X-ray generation apparatus according to claim 15, further comprising a shaft attached to the electron tube target, wherein the shaft is stored in the container, and the electron tube target is configured to be rotated together with the shaft.

19. An X-ray computed tomography (CT) apparatus comprising: the X-ray generation apparatus according to claim 11; and a detection unit detects configured to detect an X-ray emitted from the X-ray generation apparatus.

20. A structural body heated to 700° C. or more, the structural body comprising:
a heat dissipation portion configured to dissipate heat of the structural body,
wherein, on a surface of the heat dissipation portion, the structural body is provided with a first concavo-convex structure where a plurality of first convex portions and a plurality of first concave portions are alternately arranged,
wherein, when the structural body is heated to 700° C. or more, a peak wavelength of an electromagnetic wave of heat emitted from the heat dissipation portion is 3 μm or less, and wherein a distance between first convex portions close to each other among the plurality of first convex portions, and/or a distance between first concave portions close to each other among the plurality of first concave portions, is/are less than half of the peak wavelength, and wherein an amount of nitrogen contained in a portion from a surface to a depth of 100 nm or less in the first concavo-convex structure is 1 at % or more, or an amount of oxygen contained in the portion is 10 at % or less.

21. A structural body heated to 700° C. or more, the structural body comprising:
a heat dissipation portion configured to dissipate heat of the structural body,
wherein, on a surface of the heat dissipation portion, the structural body is provided with a first concavo-convex structure where a plurality of first convex portions and a plurality of first concave portions are alternately arranged,
wherein, when the structural body is heated to 700° C. or more, a peak wavelength of an electromagnetic wave of heat emitted from the heat dissipation portion is 3 μm or less,
wherein a distance between first convex portions close to each other among the plurality of first convex portions, and/or a distance between first concave portions close to each other among the plurality of first concave portions, is/are less than half of the peak wavelength, and
wherein the first concavo-convex structure includes particles, and a particle size of the particles is 50 nm or more and less than 1500 nm.

22. The structural body according to claim 21, wherein a difference between a minimum particle size of the particles and a maximum particle size of the particles is 300 nm or more.

23. A manufacturing method for manufacturing a structural body having a first concavo-convex structure where a plurality of first convex portions and a plurality of first concave portions are alternately arranged and a second concavo-convex structure where a plurality of second convex portions and a plurality of second concave portions are alternately arranged, the manufacturing method comprising:
processing for surface-treating a surface of a member with laser light, the member being composed of a metal having a melting point of 1500° C. or more; and
wherein in the processing, forming a concavo-convex structure corresponding to the second concavo-convex structure by partially removing a part of the member, and forming a concavo-convex structure corresponding to the first concavo-convex structure by depositing a particles generated from the part of the member on the surface of the second concavo-convex structure,
wherein a distance between first convex portions close to each other among the plurality of first convex portions, and/or a distance between first concave portions close to each other among the plurality of first concave portions, is/are less than 1500 nm, and
wherein a distance between second convex portions close to each other among the plurality of second convex portions is longer than the distance between the first convex portions, or a distance between second concave portions close to each other among the plurality of second concave portions is longer than the distance between the first concave portions.

24. The manufacturing method according to claim 23, wherein after the deposition, the first concavo-convex structure and the second concavo-convex structure are heat-treated at 800° C. or more in a hydrogen atmosphere.

25. The manufacturing method according to claim 23, wherein the member is composed of tungsten, molybdenum, niobium, tantalum, rhenium, hafnium, zirconium, or yttrium.

* * * * *